United States Patent
Shields et al.

(10) Patent No.: US 6,840,538 B2
(45) Date of Patent: Jan. 11, 2005

(54) METHOD AND SYSTEM OF ACTUATING A DEPLOYMENT OF A VEHICLE RESTRAINT SYSTEM

(75) Inventors: Anne Marie Shields, Ann Arbor, MI (US); Paul Kirk Zoratti, South Lyon, MI (US); Mark Edward Shields, Plymouth, MI (US)

(73) Assignee: Autoliv ASP, Inc., Ogden, UT (US)

( * ) Notice: Subject to any disclaimer, the term of this patent is extended or adjusted under 35 U.S.C. 154(b) by 189 days.

(21) Appl. No.: 10/034,092

(22) Filed: Dec. 28, 2001

(65) Prior Publication Data

US 2004/0007859 A1 Jan. 15, 2004

(51) Int. Cl.⁷ .............................................. B60R 21/32
(52) U.S. Cl. ....................... 280/735; 180/274; 701/45
(58) Field of Search ....................... 280/735; 180/274; 701/45; 340/436

(56) References Cited

U.S. PATENT DOCUMENTS

| | | |
|---|---|---|
| 3,990,040 A | 11/1976 | Gleitz et al. |
| 4,830,461 A | 5/1989 | Ishiharada et al. |
| 4,951,985 A | 8/1990 | Pong et al. |
| 5,157,372 A | 10/1992 | Langford |
| 5,299,387 A | 4/1994 | Miller et al. |
| 5,309,135 A | 5/1994 | Langford |
| 5,419,407 A | 5/1995 | Meyer et al. |
| 5,428,534 A | 6/1995 | Wetzel et al. |
| 5,583,476 A | 12/1996 | Langford |
| 5,793,005 A | 8/1998 | Kato |
| 5,797,623 A | 8/1998 | Hubbard |
| 6,015,163 A | 1/2000 | Langford et al. |
| 6,031,484 A | 2/2000 | Bullinger et al. |
| 6,115,659 A * | 9/2000 | Buchheim et al. .......... 280/735 |
| 6,169,479 B1 | 1/2001 | Boran et al. |
| 6,234,519 B1 * | 5/2001 | Breed ........................ 280/735 |

FOREIGN PATENT DOCUMENTS

| | | | |
|---|---|---|---|
| DE | 42 37 404 | 5/1994 | |
| DE | 19957187 A1 * | 5/2001 | ........... B60R/21/01 |
| EP | 0 775 613 | 5/1997 | |
| FR | 2 693 795 | 1/1994 | |
| WO | 01/23224 | 4/2001 | |

* cited by examiner

*Primary Examiner*—Peter C. English
(74) *Attorney, Agent, or Firm*—Brinks Hofer Gilson & Lione; Sally J. Brown; James D. Erickson (57) ABSTRACT

The present invention involves a method of actuating a deployment of a vehicle airbag during an impact event of a vehicle. The method includes providing a vehicle impact sensor having a plurality of elements, wherein each element is adapted to generate an impact sensor signal having a sensor signal value representing a level of impact. The method further comprising receiving an impact sensor signal from each element during the impact event of the vehicle and summing the sensor signal values of the impact sensor signals to define an aggregate sensor signal value. The method further includes determining a number of impact sensor signals having respective sensor signal values greater than an active element threshold value to define a number of active elements and determining a threshold aggregate sensor signal value based on the number of active elements. The method further includes generating an actuating signal for deploying the airbag, when the aggregate sensor signal value is greater than the threshold aggregate sensor signal value.

28 Claims, 5 Drawing Sheets

METHOD AND SYSTEM OF ACTUATING A DEPLOYMENT OF A VEHICLE RESTRAINT SYSTEM

FIELD OF THE INVENTION

The present invention relates to a method and system of actuating a deployment of a vehicle restraint system during an impact event of a vehicle.

BACKGROUND OF THE INVENTION

Almost all passenger motor vehicles presently produced include some type of impact deployed restraint system to protect vehicle occupants, or others, during a vehicle impact event. Such restraint systems may include, for example, front and side airbags within the passenger compartment, side curtains, inflatable seat belts, and seat belt pretensioners. Sensing systems and methods typically control the deployment of such restraints by determining the severity of a vehicle impact event.

During most impact events, the opportunity to provide occupant restraint exists only for a very brief period of time. Furthermore, inadvertent deployment of a restraint, such as an airbag, is undesirable. Therefore, to be most effective, impact deployed restraints must deploy quickly when needed, and only when actually needed. To this end, impact systems implement methods to allow the systems to discriminate between severe and relatively harmless impact events and to also be insensitive to mechanical inputs which are not associated with crash events. More importantly, however, the sensor are configured to allow for rapid detection of the impact event and transmission of relevant information for effective deployment. The need for a sensor having a method or process which allows for rapid deployment decisions is particularly great with side airbags, where the crush zone is much smaller than that associated with front airbags, and the time available for a deployment decision is likewise shorter.

BRIEF SUMMARY OF THE INVENTION

The present invention generally provides an improved method of actuating a deployment of a vehicle restraint system during an impact event, wherein the method uses a measure of deformation of the vehicle and a measure of width of impact to actuate a deployment of the vehicle restraint system. The method allows a controller or a control module having a microprocessor to discriminate between a severe impact event wherein deployment is actuated and a non-severe impact event wherein deployment is not actuated. The method also allows the control module to filter out mechanical inputs and electrical noise which are not associated with crash events. The present invention further provides a method which allows the control module to quickly assess an impact event for effective and rapid deployment of the vehicle restraint system.

Further aspects, features and advantages of the invention will become apparent from consideration of the following description and the appended claims when taken in connection with the accompanying drawings.

DETAILED DESCRIPTION OF THE INVENTION

Figure 1:
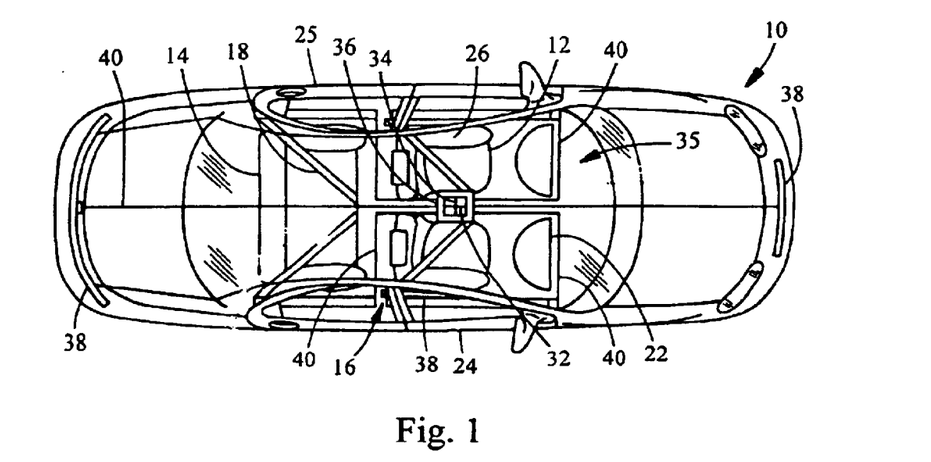
FIG. 1 is a schematic environmental plan view of a vehicle including an impact sensing system implementing one method of the present invention.
Figure 2:
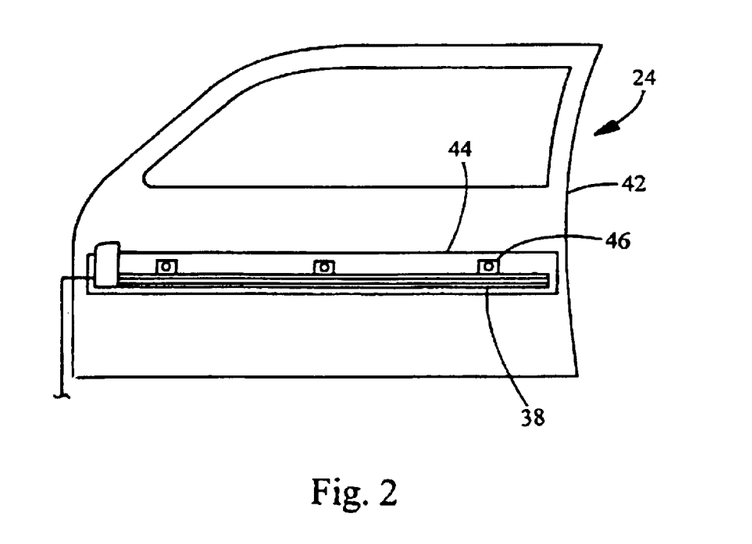
FIG. 2 is a schematic side view of a vehicle door with a plurality of sensor strips of the impact sensing system mounted on the vehicle door.

FIGS. 1 and 2 illustrate a vehicle 10 having several deployable restraints, wherein vehicle 10 includes an input sensing system implementing one method of the present invention. The vehicle has front 12 and rear 14 seats in a passenger compartment 16. Mounted in front of the two front seats 12 are front airbags 22. Vehicle 10 further includes two front doors 24 and two rear doors 25, all of which may include a side airbag 26 mounted alongside, adjacent the front 12 and rear 14 seats.

The vehicle 10 may, although not necessarily, be equipped with accelerometers, a first frontal accelerometer 32 oriented to sense longitudinal acceleration of the vehicle and a second side accelerometer 34 oriented to sense side-to-side (i.e., lateral) acceleration. Alternatively, the two accelerometers 32, 34 can be replaced with a single dual-axis acceleration sensor if so desired. These accelerometers 32, 34 are electronically connected to and in communication with a restraints control module 36.

Figure 3:
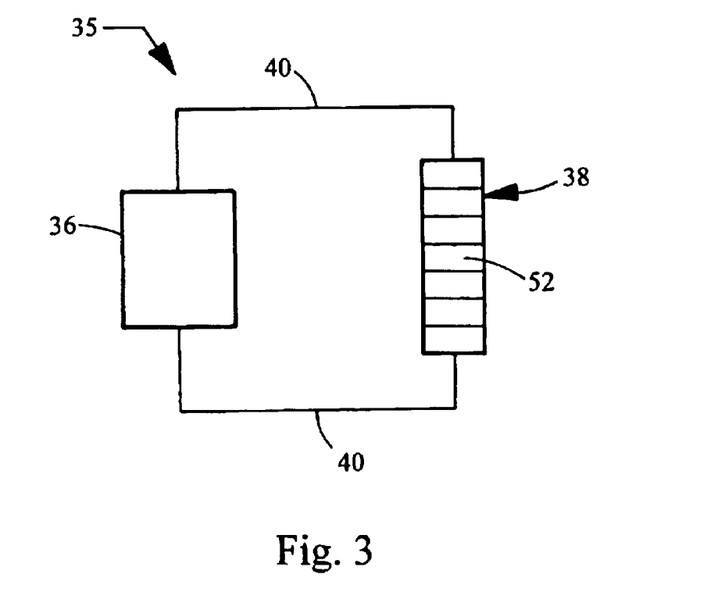
FIG. 3 is a schematic view of the impact sensing system incorporating one method of the present invention.

FIG. 3 illustrates impact sensing system 35 of the present invention implemented in vehicle 10. System 35 comprises deformation sensor element 38 having a plurality of sensor strips 52, a restraints control module 36, and electrical connections 40 between the sensor element 38 and the restraints control module 36. Sensor element 38 may be located at various positions throughout the vehicle. The sensor element 38 of the present invention may be utilized in several areas of the vehicle. Generally, the sensor element 38 may be mounted in areas around the body of the vehicle 10 in which impact sensing is desired, i.e., areas in which impact events are known to occur. For example, the sensor element 38 may be disposed within a door 24 of the vehicle 10 for detecting side impact events. Other locations may, of course, be desirable. No matter where located, the sensor element 38 is disposed in a manner that allows direct detection of an impact event. That is, the sensor element 38 is disposed in a manner that ensures its physical involvement in an impact event generating sufficient deformation of the vehicle 10.

The term impact or deformation sensor is used to describe a sensor, e.g., sensor element 38, capable of this direct physical involvement in vehicle impact events causing sufficient deformation of the vehicle 10. For example, as shown in FIG. 2, the sensor element 38 may be disposed on a structural element of a vehicle door 24. In this configuration, the sensor element 38 will directly participate in a side impact event affecting the vehicle door 24.

The position of the sensor element 38 facilitates the sensing system 35 in discriminating among impact events. For example, the outer skin 42 of a vehicle door 24 is frequently exposed to impact events not warranting deployment of a passive restraint. A slight indentation to this structural element does not warrant deployment. Therefore, positioning the sensor element 38 on the surface of this structural elements may lead to unnecessary deployment. Positioning the sensor element 38 sufficiently underneath the outer skin 42 of the structural element while ensuring its participation in significant impact events eliminates such unnecessary deployments.

As mentioned above, FIG. 2 illustrates an example of the sensor element 38 mounted in a vehicle door 24. The sensor element 38 is positioned underneath the outer skin 42 and near a main structural element, such as a structural reinforcement beam 44. The sensor element 38 can be mounted thereto via attachment points 46. Alternatively, the sensor element 38 can be disposed within a housing member (not illustrated), and the housing member can be mounted securely to the reinforcement beam 44 via attachment points 46. The attachment points 46 can be fasteners, welding, etc., so long as the sensor element 38 and/or housing is securely and rigidly mounted to the reinforcement beam 44.

In this embodiment, sensor element 38 is in electrical communication with the restraints control module 36 via electrical connections 40. In this embodiment, the restraints control module 36 is electrically connected to and in communication with the deployable restraints of the vehicle 10.

In the preferred embodiment, the sensor element 38 has a plurality of sensor strips 52, each of which constitutes a bend sensitive resistance element 50. Bend sensitive resistance elements, such as the flexible potentiometer disclosed in U.S. Pat. No. 5,583,476 to Langford, provide electrical signals that vary as the element is deformed. A bend sensitive resistance element 50 is only one example of the type of sensor that can be used as the sensor element 38 in the sensing system 35 of the present invention, and is not intended to limit the scope of the present invention in any way.

Figure 4:
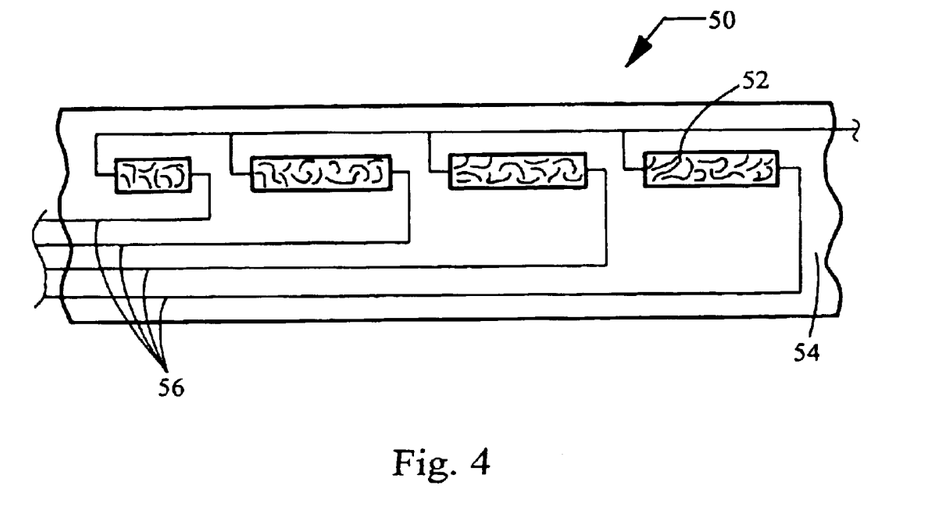
FIG. 4 is a schematic view of the plurality of sensor strips implemented in one method of the present invention.

In this embodiment, the bend sensitive resistance element 50 is comprised of a plurality of rectangular ink strips 52 composed of a conductive ink which has been treated to produce cracks in the ink, a flexible substrate 54, and electrical connectors 56 for connecting the conductive ink strips 52 and the restraints control module 36. As shown in FIG. 4, the conductive ink is arranged into the strips 52 each in independent electrical communication with the restraints control module 36. In this embodiment, ink strips 52 are disposed horizontally relative to each other, i.e., end-to-end, along a unitary flexible substrate 54. In this embodiment, the ink strips are preferably about ¼" in height by approximately 4" in length. Flexible substrate 54 is preferably about 1" in height and has a length approximately equal to the structural element being monitored. An appropriate number of ink strips 52 necessary to span the length of the flexible substrate 54 is disposed on the flexible substrate 54. It has been determined that, for a typical front vehicle door 24, seven ink strips 52 of the preferable dimensions, laid end-to-end on the flexible substrate 54 provide adequate coverage of the span.

Arranged in this manner, the ink strips 52 are termed as individual bend sensitive resistance elements 50, providing a degree of azimuthal resolution. For example, when an impact event occurs near the latch of the door 24, causing deformation only in that area, the element 50 or stripe 52 located in that area will deform, and therefore it will be the only element 50 that relays a deformation signal representative of the deformation to the strips 52. This localization of the impact will allow the restraints control module 36 in implementing one method of the present invention (described below) to better discriminate among severe and non-severe impact events. Furthermore, this arrangement of a plurality of bend sensitive resistance elements 50 facilitates one method of the present invention in providing an improved ability to resolve the location and width of an impact event relative to the vehicle 10.

The conductive ink strip 52 of the bend sensitive resistance element 50 is printed onto flexible substrate 54. Preferably, the substrate 54 is a flexible material such as polyamide. Polyester or other suitable materials capable of providing the flexibility may also be used. The flexible nature of the substrate 54 allows the bend sensitive resistance element 50 to be disposed along a non-linear surface. Also, the flexible substrate 54 provides the flexibility to allow the ink strips 52 to structurally react in response to impact events, which provides proper operation of the bend sensitive resistance element 50, and consequently, the sensing system 35. The flexible substrate 54 may have an adhesive backing which facilitates placement on structural elements or in a housing.

As mentioned above, the conductive ink of the ink strip has been treated to produce cracks in the ink. Such cracks are small, interspersed fissures in the ink strip 52 of the bend sensitive resistance element 50. The cracks are randomly spaced and oriented throughout the ink strip 52. The cracks are disposed along a single side of the strip 52, making the bend sensitive resistance element 50 sensitive in only one direction. When used to monitor for the occurrence of side impact events in a vehicle door, the surface having the cracks is typically directed toward compartment 16 of the vehicle 10. As the bend sensitive resistance element 50 is bent inward, such as when a side impact occurs, the cracks open and increase the resistance of the element 50. This change in resistance can be detected by the restraints control module 36, which continually monitors resistance signals or output of the element 50, e.g., sensor or resistance values.

In addition to bend sensitive resistance elements 50, the sensor element 38 may be any other type of sensor element 38 having a plurality of sensor portions capable of being disposed in a manner that allows direct physical involvement in an impact event, and gathering and relaying information regarding the impact event. No matter the type of deformation sensor utilized, the sensor element 38 can be a plurality of elongate sensor portions 38 horizontally situated so as to be capable of providing azimuthal resolution of impact events.

Figure 5A:
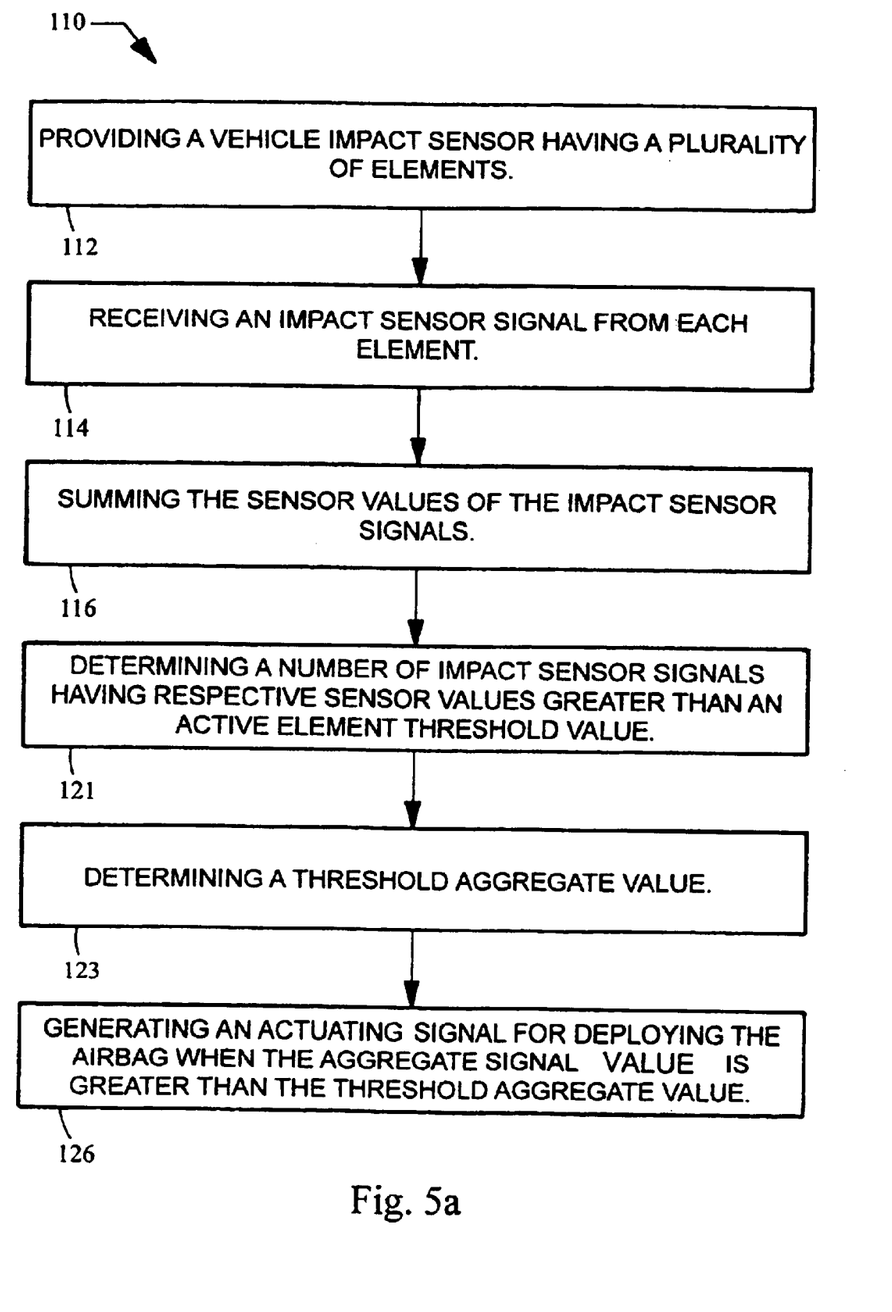
FIG. 5a is a flow chart of one method of the present invention implemented by the input sensing system.
Figure 5B:
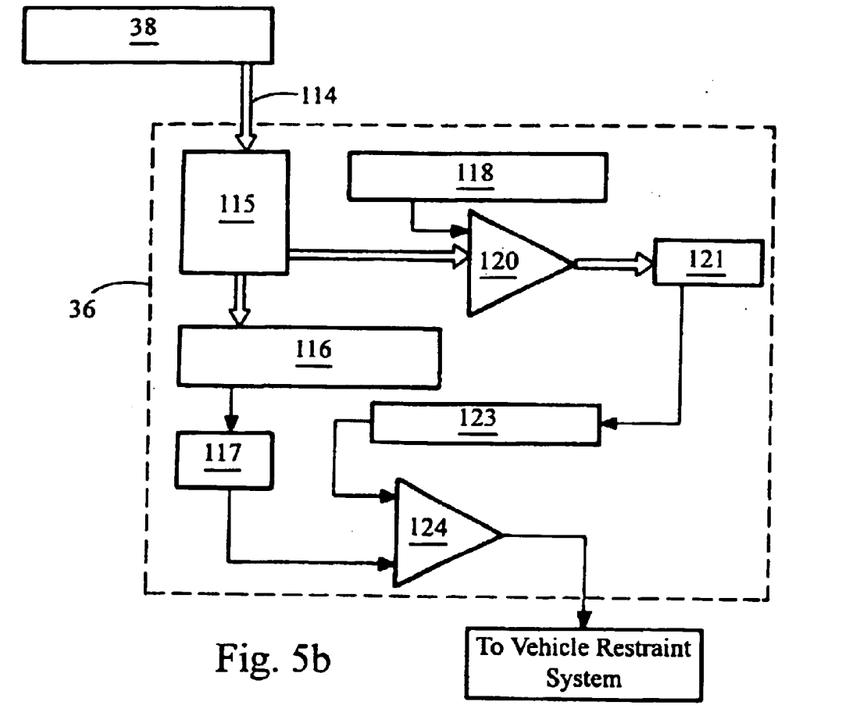
FIG. 5b is a controls diagram depicting a path through which data or the sensor signal values are processed by the impact sensing system in accordance with one method of the present invention.

FIGS. 5a and 5b illustrate one method 110 of actuating a deployment of a vehicle restraint system during an impact event of the vehicle in accordance with the present invention, in this embodiment, method 110 is configured in the control module; however, method 110 may be configured in any other suitable module without falling beyond the scope or spirit of the present invention. Method 110 allows the control module (mentioned above) to receive and detect sensor signals having resistance values from the vehicle impact sensor (mentioned above) and to distinguish between severe and non-severe events based on the width of an impact and the deformation of the vehicle. This is generally accomplished by receiving sensor signals during an impact event, manipulating the resistance values of the sensor signals, and comparing the manipulated values with threshold values. Method 110 provides the vehicle impact sensor including a sensor element having a plurality of strips, wherein each strip is adapted to generate an impact sensor signal having a sensor signal value representing a level of impact in box 112. As mentioned above, the impact sensor signals from the impact deformation sensor have a characteristic indicative of the impact event or the deformation of the vehicle. In this embodiment, a change or increase in resistance is detected by the control module 36. During an impact event, e.g., an impact at a vehicle side door at which the plurality of sensor strips are disposed, each sensor strip generates a sensor or resistance value representative of a level of impact onto a respective portion of the door. In this embodiment, each strip being deformed by the impact event bends (as mentioned above) providing the sensor or resistance value representative of the level of impact. During the impact event, the impact sensor signals are received by the control module in box 114 from each sensor strip.

Figure 6:
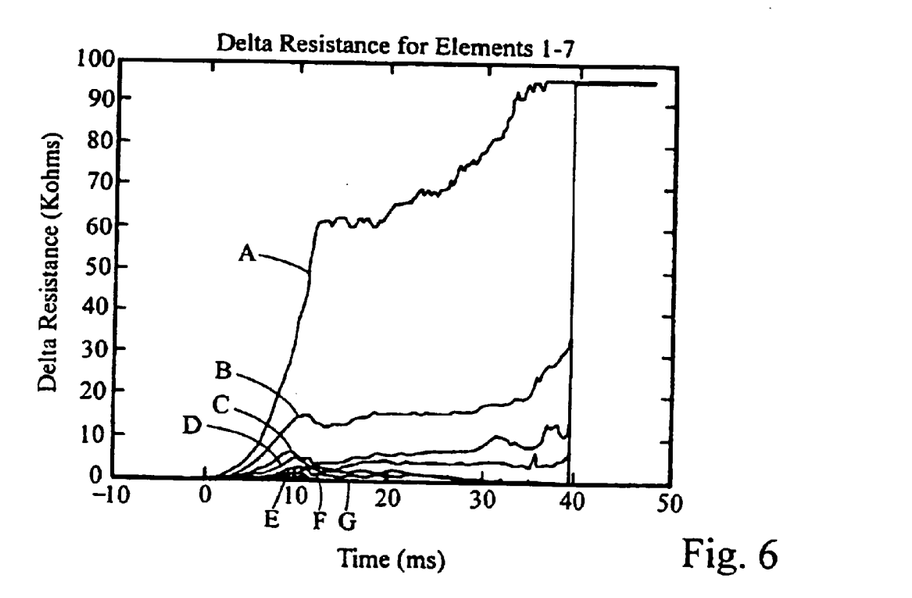
FIG. 6 is a graphical illustration of sensor signal values of sensor signals or outputs generated by the plurality of sensor strips during an impact event in accordance with one method of the present invention.

The impact sensor signals are then conditioned by a low-pass filter in box 115, defining corresponding filtered signals. This low-pass filtering process is performed to remove high frequency components that are not useful to discriminate the impact event. As shown in FIG. 6, sensor signals having resistance values received by the control module are plotted over time to illustrate a chronologic change and increase in resistance during an impact event. In this embodiment, the impact sensor has a sensor element comprising seven sensor strips A-G generating sensor signals having separate resistance values based on the level of impact or deformation on each strip. As shown, a greater change in resistance per time indicates a greater level of impact to the strip or deformation to the vehicle. However, it is understood that FIG. 6 is provided for illustration purposes only and that the method of the present invention is not necessarily time dependent.

Figure 7:
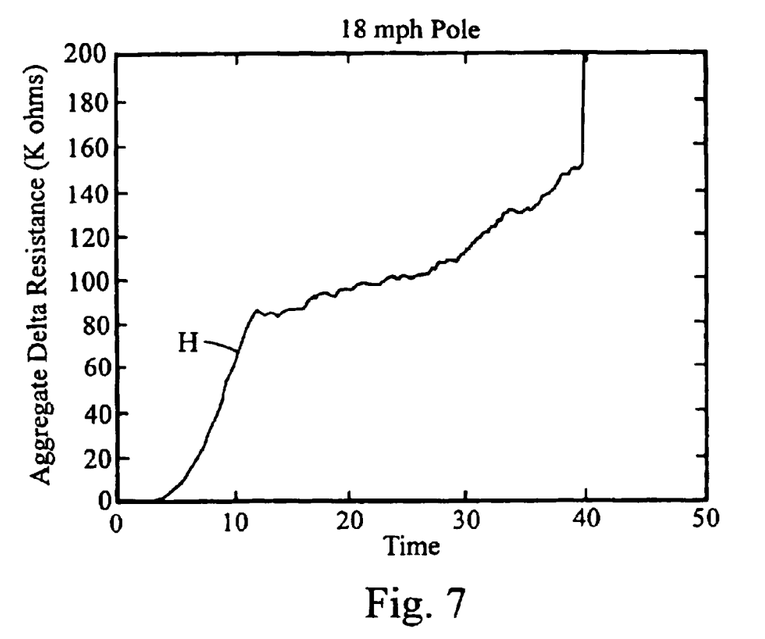
FIG. 7 is a graphical illustration of an aggregate sensor signal value corresponding to the sensor signal values depicted in FIG. 5.

The control module then sums the sensor signal values of the low-pass filtered sensors signals to define an aggregate sensor signal value in box 116 which is compared to a threshold aggregate sensor signal value (described below). Thus, the aggregate sensor signal value may be a summation of the resistance values of low-pass filtered sensor signals generated by the sensor strips during the impact event. As shown in FIG. 7, the resistance values of the sensor signals having resistance values received by the control module are summed and plotted over time to illustrate a chronological aggregate value H of the sensor signals. This also depicts a continuous change and increase in aggregate resistance during an impact event. During the impact event, the aggregate value is shown to increase over a duration of time. As shown, a greater change or increase in aggregate resistance indicates a greater level of impact to the strips or deformation to the vehicle. However, it is understood that FIG. 7 is provided for illustration purposes only and that the method of the present invention is not necessarily time dependent. Then, the aggregate sensor signal value is conditioned by a high-pass filter in box 117 to further eliminate low frequency components that are not useful in discriminating the impact event.

As shown in FIG. 5b, the sensor signal values of the low-pass filtered signals are also processed through a comparator function in box 120 wherein a number of active elements are determined. The control module provides a nominal activation threshold representing a preliminary value for the number of active elements at nominal conditions. During each process through the comparator, the control module adjusts the nominal activation threshold in box 118 based on environmental factors to define an active element threshold value. In this embodiment, the active element threshold value may be defined as a threshold value for each sensor signal value received to determine whether the sensor strip corresponding to the sensor signal value warrants an "active element" status. This may be accomplished with a gain compensator function as known in the art. An active element may be defined as an element or strip of the impact sensor generating a sensor signal having a signal value greater than the active element threshold value. The active element threshold value may vary depending on the desired sensitivity of the sensor. The active element threshold value is based on environmental factors which include temperature, humidity, and pressure during the impact situation.

Figure 8:
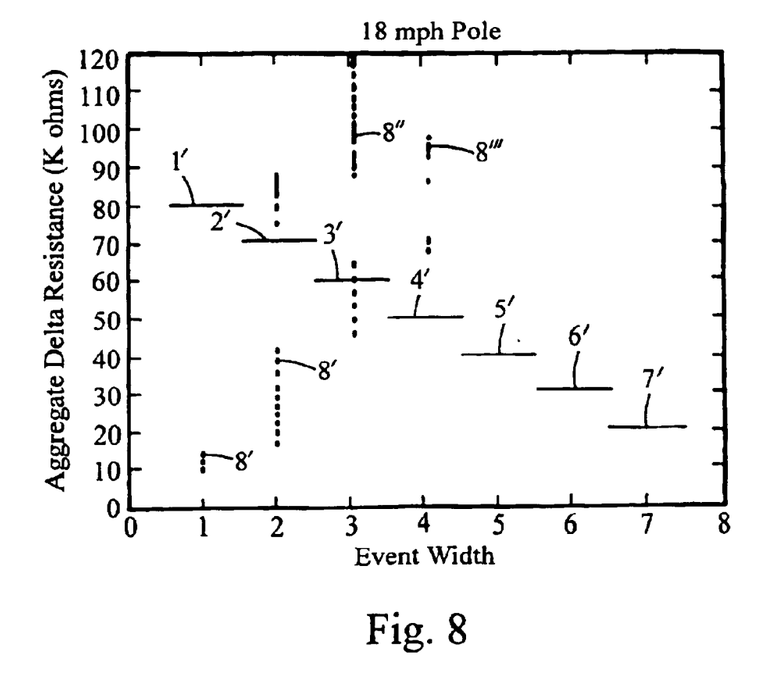
FIG. 8 is a graphical illustration of threshold aggregate sensor signal values based on a number of active sensor elements in accordance to one method of the present invention.

The control module then determines the number of impact sensor signals in box 121 having respective sensor signal values greater than the active element threshold value defining the number of active elements at environmental conditions. This is accomplished by comparing each sensor signal value with the active element threshold value. The control module then sums or determines a number of sensor signal values that are greater than the active element threshold value. The number of active elements represents a number of sensor strips which experience an impact event exceeding a predetermined level of deformation. This number indicates the width of the impact event on the vehicle. A threshold aggregate sensor signal value is determined in box 123 based on the number of active elements or the width of the impact event on the vehicle. This allows the control module to incorporate a predetermined deformation threshold depending on the width of the impact event. Each predetermined deformation threshold preferably varies based on the number of active elements involved. As shown in FIG. 8, a different threshold aggregate sensor signal value 1'-7' is used for each number of active elements of a total number of strips. The control module is configured to include a set of predetermined threshold aggregate sensor signal values corresponding to a number of active elements of a total number of sensor strips. A number of aggregate sensor signal values 8—8'" are plotted according to their respective number of active elements. For example, in this embodiment, for an impact event involving a sensor element having seven sensor strips wherein three strips are determined to be active strips, the threshold aggregate sensor signal value is about 60 K Ohms as it can be seen.

Then, the control module compares the aggregate sensor signal value with the threshold aggregate sensor signal value in box 124. When the aggregate sensor signal value is greater than the threshold aggregate sensor signal value, the control module generates in box 126 an actuating signal for deploying the airbag. Incorporating the width of the impact event and the amount of deformation to the vehicle allows the impact sensing system to quickly and adequately distinguish between severe and non-severe impact events. The actuating signal may be sent to a vehicle restraint system in the vehicle to deploy a respective restraint system, e.g., a corresponding airbag.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method of actuating a deployment of a vehicle airbag during an impact event of a vehicle, the method comprising:
providing a vehicle impact sensor having a plurality of sensor elements, each of the plurality of elements adapted to generate an impact sensor signal having a sensor signal value indicative of a severity level of the impact event;
receiving an impact sensor signal from each element during the impact event of the vehicle;
summing the sensor signal values of the impact sensor signals to define an aggregate sensor signal value;
determining a number of impact sensor signals having respective sensor signal values greater than an active sensor element threshold value to define a number of active sensor elements;
determining a threshold aggregate sensor signal value based on the number of active sensor elements; and
generating an actuating signal for deploying the vehicle airbag, when the aggregate sensor signal value is greater than the threshold aggregate sensor signal value.

2. The method of claim 1 further comprising conditioning the impact sensor signals with a low-pass filter to define filtered signals corresponding to the impact sensor signals, before summing the sensor signal values.

3. The method of claim 2 wherein summing the sensor signal values includes summing the sensor signal values of the filtered signals to define the aggregate sensor signal value.

4. The method of claim 2 further comprising conditioning the aggregate sensor signal value with a high-pass filter, after summing the sensor signal values.

5. The method of claim 1 further comprising:
providing a nominal activation threshold representing a predetermined value for the number of active sensor elements at nominal conditions; and
adjusting the nominal activation threshold based on environmental factors to define the active element threshold value.

6. The method of claim 5 wherein the environmental factors include temperature, humidity, and pressure during the impact event.

7. The method of claim 1 wherein determining a number of impact sensor signals comprises:
comparing each sensor signal value with the active element threshold value; and
summing the number of sensor signal values that are greater than the active element threshold value.

8. The method of claim 1 further comprising comparing the aggregate sensor signal value with the threshold aggregate sensor signal value, before generating the actuating signal.

9. The method of claim 1 wherein each element is a bend sensitive resistance element.

10. The method of claim 9 wherein the bend sensitive resistance elements are disposed on a flexible substrate.

11. A method of actuating a deployment of a vehicle airbag during an impact event of a vehicle, the method comprising:
providing a vehicle impact sensor having a plurality of elements, each element adapted to generate an impact sensor signal having a sensor signal value representing a level of impact;
receiving an impact sensor signal from each element during the impact event of the vehicle;
determining an aggregate sensor signal value based on a summation of the sensor signal values of the impact sensor signals;
determining a threshold aggregate sensor signal value based on a number of active elements having impact sensor signals with sensor signal values greater than an active element threshold value;
generating an actuating signal for deploying the airbag, when the aggregate sensor signal value is greater than the threshold aggregate sensor signal value.

12. The method of claim 11 wherein determining the aggregate sensor signal value includes summing the sensor signal values of the impact sensor signals to define the aggregate sensor signal value.

13. The method of claim 11 further comprising determining the number of impact sensor signals having respective sensor signal values greater than the active element threshold value to define the number of active elements.

14. The method of claim 11 further comprising low-pass filtering the impact sensor signals to define filtered signals corresponding to the impact sensor signals, before summing the sensor signal values.

15. The method of claim 14 wherein summing the sensor signal values includes summing the sensor signal values of the filtered signals to define the aggregate sensor signal value.

16. The method of claim 14 further comprising high-pass filtering the aggregate sensor signal value, after summing the sensor signal values.

17. The method of claim 11 further comprising:
providing a nominal activation threshold representing a predetermined value for the number of active elements at nominal conditions; and
adjusting the nominal activation threshold based on environmental factors to define the active element threshold value.

18. The method of claim 17 wherein the environmental factors include temperature, humidity, and pressure during the impact event.

19. The method of claim 11 further comprising:
comparing each sensor signal value with the active element threshold value; and
summing the number of sensor signal values that are greater than the active element threshold value to determine the number of active elements.

20. The method of claim 11 further comprising comparing the aggregate sensor signal value with the threshold aggregate sensor signal value, before generating the actuating signal.

21. A method of determining an impact event of a vehicle for deployment of an airbag, the method comprising:
providing a vehicle impact sensor including a plurality of elements adapted to generate a plurality of impact sensor signals having sensor signal values representing a plurality of levels of impact;
receiving the plurality of impact sensor signals from the elements during the impact event of the vehicle, the sensor signals having respective sensor signal values that are summed to define an aggregate sensor signal value;
determining the number of sensor signal values of the sensor signals that are greater than an active element threshold value;
determining whether the aggregate sensor signal value is greater than a threshold aggregate sensor signal value, if at least one of the sensor signal values is determined to be greater than the active element threshold value; and generating an actuating signal for deploying the airbag, if the aggregate sensor signal value is determined to be greater than the threshold aggregate sensor signal value.

22. The method of claim 21 further comprising low-pass filtering the impact sensor signals to define filtered signals having the respective sensor signal values defining the aggregate sensor signal value.

23. The method of claim 22 further comprising high-pass filtering the aggregate sensor signal value.

24. The method of claim 21 further comprising:

providing a nominal activation threshold representing a preliminary value for the active element threshold value at nominal conditions; and adjusting the nominal activation threshold based on environmental factors to define the active element threshold value.

25. The method of claim 24 wherein the environmental factors include temperature, humidity, and pressure during the impact event.

26. The method of claim 21 wherein each element is a bend sensitive resistance element.

27. The method of claim 26 wherein each bend sensitive resistance element is disposed on a flexible substrate.

28. A system for actuating a deployment of a vehicle airbag during an impact event of a vehicle, the system comprising:

a vehicle impact sensor having a plurality of elements adapted to generate a plurality of impact sensor signals during the impact event, the sensor signals each having a sensor signal value representing a level of impact and when summed define an aggregate sensor signal value; and a processor in electrical communication with the impact sensor, wherein the processor determines whether each of the plurality of elements is an active element and whether the number of active elements is greater than an active element threshold value and whether the aggregate sensor signal value is greater than a threshold aggregate sensor signal value, and wherein the processor is configures to generate an actuating signal for deploying the airbag, when at least one of the active elements is determined to be greater than the active element threshold value and the aggregate sensor signal value is determined to be greater than the threshold aggregate sensor signal value.

* * * * *

UNITED STATES PATENT AND TRADEMARK OFFICE
CERTIFICATE OF CORRECTION

PATENT NO. : 6,840,538 B2
DATED : January 11, 2005
INVENTOR(S) : Anne Marie Shields et al.

It is certified that error appears in the above-identified patent and that said Letters Patent is hereby corrected as shown below:

Column 10,
Line 19, delete "configures" and substitute -- configured -- in its place.

Signed and Sealed this

Twelfth Day of July, 2005

JON W. DUDAS
*Director of the United States Patent and Trademark Office*